United States Patent
Rainer et al.

(10) Patent No.: US 7,398,821 B2
(45) Date of Patent: Jul. 15, 2008

(54) INTEGRATED VENTILATION COOLING SYSTEM

(75) Inventors: Leo I. Rainer, Davis, CA (US); David A. Springer, Winters, CA (US)

(73) Assignee: Davis Energy Group, Davis, CA (US)

( * ) Notice: Subject to any disclaimer, the term of this patent is extended or adjusted under 35 U.S.C. 154(b) by 467 days.

(21) Appl. No.: 09/802,883

(22) Filed: Mar. 12, 2001

(65) Prior Publication Data

US 2002/0124992 A1 Sep. 12, 2002

(51) Int. Cl.
*F24F 11/04* (2006.01)

(52) U.S. Cl. ........................ 165/247; 165/244; 165/248; 165/291; 454/258

(58) Field of Classification Search ................ 165/11.1, 165/50, 57, 221, 244, 247, 291, 248; 454/258; 236/13, 49

See application file for complete search history.

(56) References Cited

U.S. PATENT DOCUMENTS

| | | | | |
|---|---|---|---|---|
| 4,386,649 A * | 6/1983 | Hines et al. | ................. | 165/240 |
| 4,389,853 A * | 6/1983 | Hile | ........................ | 236/49 X |
| 4,501,125 A * | 2/1985 | Han | | |
| 4,543,796 A * | 10/1985 | Han et al. | ................. | 236/49 X |
| 4,775,944 A * | 10/1988 | Nakamura | ................. | 165/205 |
| 4,811,897 A * | 3/1989 | Kobayashi et al. | ............ | 236/49 |
| 5,065,585 A * | 11/1991 | Wylie et al. | | |
| 5,096,156 A * | 3/1992 | Wylie et al. | | |
| 5,547,017 A * | 8/1996 | Rudd | ........................ | 165/244 |
| 5,881,806 A * | 3/1999 | Rudd | ........................ | 165/244 |
| 5,902,183 A * | 5/1999 | D'Souza | ..................... | 454/258 |
| 5,924,486 A * | 7/1999 | Ehlers et al. | ................ | 165/238 |
| 6,098,893 A * | 8/2000 | Berglund et al. | ............ | 236/51 |
| 6,250,382 B1 * | 6/2001 | Rayburn et al. | ............. | 165/248 |
| 6,318,096 B1 * | 11/2001 | Gross et al. | ............... | 236/13 X |

* cited by examiner

*Primary Examiner*—Ljiljana (Lil) V Ciric
(74) *Attorney, Agent, or Firm*—Oliff & Berridge, PLC

(57) ABSTRACT

A system and method for cooling and heating of buildings comprising an integrated assembly of devices, including a variable speed air handler, hot water heating coil, outside air damper, controller, and optional compressor-based air conditioner. During the summer the system utilizes nighttime outside air for cooling and uses air temperature predictions to provide information about optimal control settings and to maintain comfort. During the winter the system varies airflow with heating demand and ventilates with outside air to maintain indoor air quality.

20 Claims, 2 Drawing Sheets

INTEGRATED VENTILATION COOLING SYSTEM

BACKGROUND OF THE INVENTION

1. Field of Invention

This invention relates to an integrated assembly of devices for providing building heating, ventilation cooling, fresh air ventilation, and air conditioning; and to improvements in controls for operating these devices.

2. Relevant Prior Art

The use of windows and doors to admit cool night air to improve the comfort and air quality of the interior of dwellings is a practice with origins in antiquity. The physical principle is to create a heat exchange between cool nighttime outside air and warmer surfaces of interior building components having significant mass such as masonry, wall and ceiling finishes, concrete floors, and furnishings. During nighttime cool outside air removes heat from the warmer surfaces. During daytime the cool surfaces of building components absorb heat from indoor air to keep the interior air temperatures lower. The cool surfaces also contribute to comfort by providing a lower mean radiant temperature, such that the human body radiates heat at a greater rate than if surrounded by warmer surfaces.

Effective use of outside air for cooling can also reduce the required capacity of air conditioners and reduce their energy consumption by reducing cooling load. In mild climates ventilation cooling can eliminate the need for compressor-based air conditioning. The most favorable outcome of the widespread use of ventilation cooling is the reduction of the peak electric load and mitigating the need to construct new power plants.

Whole-house fans have been used for several decades to provide a means of improving air exchange and circulation between indoors and outdoors; controls for these devices are typically switches, timers, and manually operated speed controls. Their relative simplicity is also a drawback. Whole house fans move air from indoors to outdoors, creating a negative indoor pressure, and rely on the operation of windows to admit air to the indoor spaces. Since this air is not filtered, dust and pollens are also admitted.

High noise levels produced by whole house fans is often objectionable.

There are also other concerns. The use of windows to provide nighttime ventilation compromises home security and requires active participation of dwelling occupants and. ventilation fan operation cannot be automated if windows must be manually opened to admit outside air. A ventilation cooling system produced by ZTECH of Rancho Cordova, Calif. (U.S. Pat. No. 5,065,585) eliminates the need to open windows. The ZTECH system provides outside air ventilation using a heating/cooling system blower and a damper with an air filter. The damper (U.S. Pat. No. 5,096,156) is connected to the intake of the blower, which supplies air to rooms of a building through ducting. In a first position of the damper, a passageway connects the blower unit to a building return air duct, thereby re-circulating indoor air for heating or air conditioning. The damper switches to a second position for ventilation cooling. In this second position a first passageway of the damper connects the blower to an outside air intake, thereby pressurizing the building with outside air. In this second position building air pressure is relieved through a second damper passageway that connects the building return air duct to a vented attic or the outdoors. In this manner the blower distributes filtered outside air to all rooms using the same ducts as used by the heating and cooling system.

The ZTECH system, and another system described in U.S. Pat. No. 5,902,183, utilize controllers that measure indoor and outdoor air temperatures and use these measurements to control when the ventilation systems should be operated. Both systems ventilate with outside air when outdoor air temperature is cooler than indoor air temperature by a selected temperature differential, and as long as the indoor air temperature is above a fixed low-limit temperature setting. Both systems also use controls that are separate from building heating and cooling system controls. Field studies conducted on homes equipped with the ZTECH system showed that homeowners lacked an understanding of how the ventilation systems worked and how they could be used to reduce energy use and improve comfort, A fixed indoor low-limit temperature setting employed by the ZTECH controls can cause excessive cooling on mild or cool days. Also, the controls provide no feedback to encourage lower indoor temperature settings that would avert air conditioner use on hot days.

Until recent years, normal leakage through gaps in construction assemblies has been sufficient to maintain indoor air quality at healthy levels in dwellings. Modern building standards and construction practices intended to conserve energy have resulted in much tighter buildings with less leakage. Several states have adopted regulations that require mechanical ventilation to exhaust indoor contaminants including carbon dioxide, carbon monoxide, excessive moisture, indoor allergens, and volatile organic compounds given off by carpeting and other building materials. Devices available to meet mechanical ventilation requirements include continuously operated bathroom fans, heat recovery ventilators, and systems that duct outside air into heating/cooling system return air ducts. In the latter category, Lipidex produces an AirCycler™ air handler system, U.S. Pat. Nos. 5,547,017 and 5,881,806, that includes an outside air duct connected between the return air plenum of a forced air heating unit and an outside air intake. A controller operates a motorized damper in the outside air duct and cycles the heating unit blower to provide fresh air. To its credit, the Lipidex system distributes fresh air to all conditioned spaces, but because this system mixes a large volume of re-circulated air with outside air, it must move more air and uses more fan energy than a system that ventilates with 100% outside air. Neither this system, nor bathroom fans, nor heat recovery ventilators move sufficient air to provide effective ventilation cooling.

A physical law that describes performance of centrifugal fans dictates that motor power demand varies with the cube of the airflow rate. High energy use, as well as noise problems, can be mitigated by employing a fan that delivers only the amount of air required to meet heating, cooling, and ventilation requirements.

Electronically commutated, variable speed, motors (ECM's) have been used to operate fans in heating and cooling systems for over a decade. These motors can be programmed to maintain constant airflow over a wide range of external static pressure, and allow the airflow to be varied by external controls. ECM's are much more efficient at low speeds than induction motors with multiple speed taps, and have been applied to provide continuously variable air delivery with heat pump systems such as the Trane XV-1500 and the Carrier Hydrotech 2000. ECM's have not previously been employed with outside air ventilation systems. ECM's are used in some variable speed gas furnaces, but current gas furnace technology does not allow airflow to be varied by more than 20%. Thus furnace fans must be cycled on and off when heating loads are low, and energy savings from motor speed reduction are much smaller than what could be achieved if airflow could be varied with heating load. Energy-saving heating and cooling thermostats that allow indoor temperatures to be scheduled over a 24 hour period are commonplace and can be used to reduce energy use. However, the scheduling features of these thermostats frequently go unused because they are not understood. Typically, a multitude of keystrokes are required to both enter and view time/temperature schedules. Also, thermostat displays do not adequately explain the meaning of their various settings.

Utility peak capacity shortages are reaching crisis proportions in areas of the U.S. Many utilities have undertaken programs to cycle air conditioning equipment off during periods of high peak demand. Conventional thermostats have no provisions for preventing operation specifically during utility peak power use periods or during power shortage alerts.

SUMMARY OF THE INVENTION

Objects of the Invention

It is an object of this invention to reduce energy use and peak electric demand by improving upon current ventilation cooling control technology by employing temperature predictions as a means of providing improved temperature control and comfort, and improved user understandings of the concept of ventilation cooling.

Another object of this invention is to increase consumer and building industry acceptance of ventilation cooling by combining ventilation cooling, heating, air conditioning, and fresh air ventilation into an integrated system that is controlled by a single user interface (thermostat).

Still another object of this invention is to reduce energy use and improve comfort by incorporating a variable speed ECM fan motor to deliver variable airflow rates for heating and ventilation cooling, and diminished airflow rates for fresh air ventilation.

These and other objects and advantages will be apparent to those skilled in the art in light of the following disclosure, claims and accompanying drawings.

DESCRIPTION OF PREFERRED EMBODIMENTS

Figure 1:
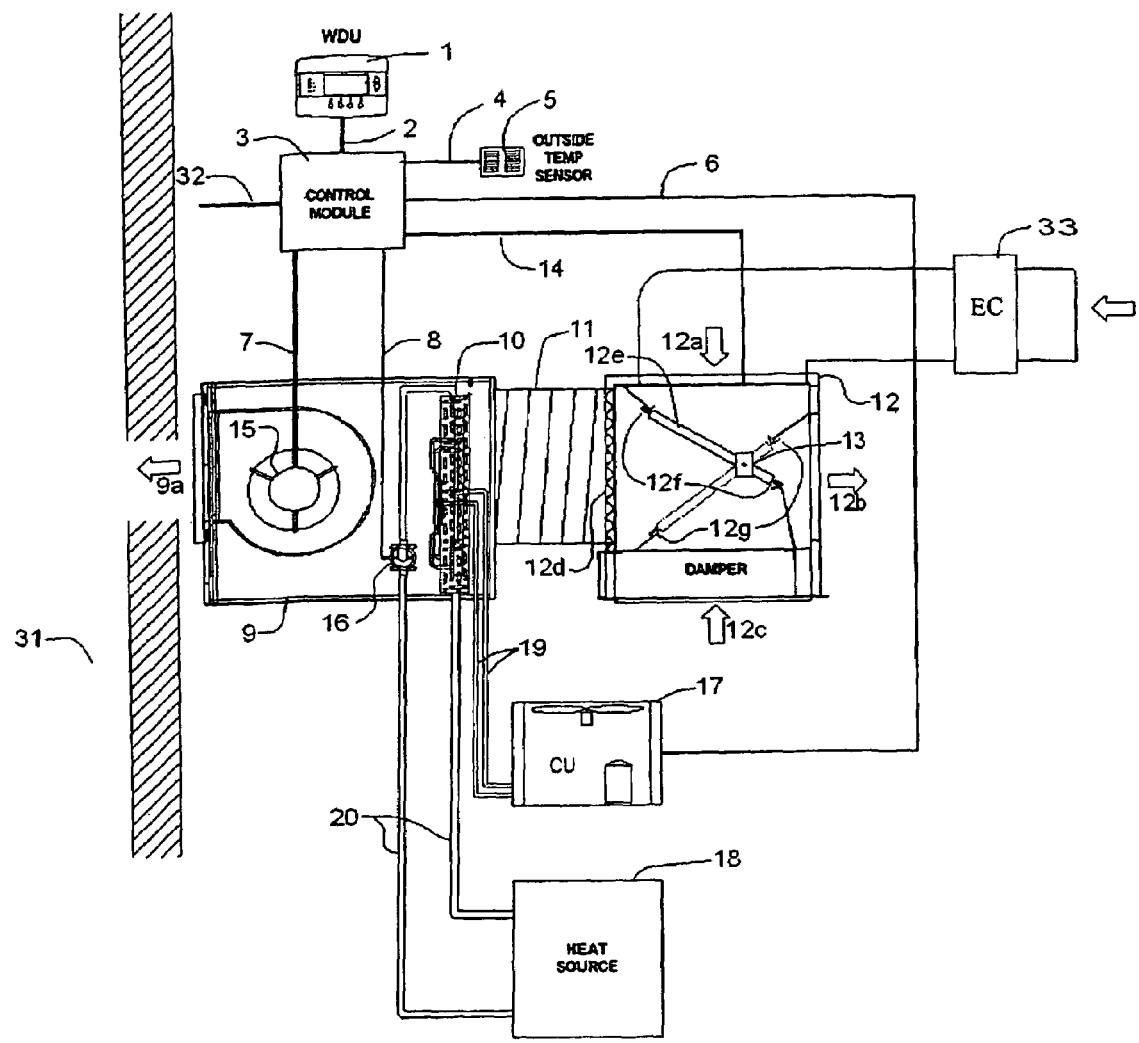
FIG. 1 is a schematic diagram of the integrated heating, ventilation cooling, and air conditioning system according to an embodiment of the present invention.

The present invention is an integrated comfort system that provides heating, ventilation cooling, air conditioning, and fresh air ventilation and is controlled using a single user interface. Components of said system include an air handler associated with a hot water heating coil or furnace, an outside air damper, a control, and an optional air conditioner evaporator and condensing unit.

A preferred embodiment of the invention is a control that regulates ventilation cooling by 1) measuring outdoor and indoor temperatures, 2) employing statistical equations programmed into the controller to predict outdoor and indoor temperatures from previously measured temperatures, and 3) applying predicted temperatures and user temperature settings to control the operation of the damper and fan motor. Said user temperature settings include minimum and maximum acceptable indoor temperatures, the former being the lowest indoor temperature at which outside air below such temperature will be used for cooling, and the latter being the indoor temperature above which compressor air conditioning will be utilized. To minimize air conditioner operation during hot weather and to avoid over-cooling during mild weather, said control adjusts the actual indoor temperature at which ventilation cooling is discontinued based on said predicted temperatures. The controller operates the ventilation system to achieve lower morning indoor temperatures on hotter days and higher morning temperatures on cooler days.

Another preferred embodiment of this invention is a user interface that includes a screen that graphically displays the predicted minimum and maximum indoor temperatures, or "comfort range", a ventilation cooling low limit temperature setting, and the air conditioning temperature setting. By viewing the relative position of said comfort range in relation to said air conditioner thermostat setting the user can determine whether his/her current low limit and air conditioner temperature setting will result in air conditioner operation.

In accordance with another preferred embodiment of this invention, said user interface includes buttons for adjusting control settings, the function of which can be redefined based on user actions.

In accordance with another embodiment, said wall display unit provides text-based onscreen instructions to the user on demand, said instructions explaining control functions and facilitating user understandings of control settings and system operation.

In accordance with another embodiment, said control includes a communications link that can be used to obtain weather predictions from weather services for control and display purposes.

In accordance with another embodiment, said user interface buttons can be used to ventilate a building on-demand using the system fan to either re-circulate indoor air or flush the building with outside air.

In accordance with another preferred embodiment of this invention, the control includes an output for operating a variable speed ECM fan motor for varying airflow rates, and user inputs for establishing independent maximum fan speed settings for ventilation cooling, heating, air conditioning, and manual fan operation. This arrangement conserves fan motor energy and allows the system to be readily adapted to a wide variety of applications and building sizes.

In accordance with another preferred embodiment, ventilation cooling airflow rates are varied in proportion to cooling demand.

In accordance with another preferred embodiment, outside air used for ventilation cooling is further cooled by a direct, indirect, or direct-indirect evaporative cooler 33 (FIG. 1)

In accordance with another preferred embodiment, energy savings resulting from the displacement of compressor-based air conditioner use by ventilation cooling are displayed by said user interface.

In accordance with another embodiment of this invention, during winter heating operation said control varies the speed of the system fan in proportion to the difference between the indoor temperature and a heating temperature setting. The purpose of this control function is to conserve fan energy, minimize drafts and fan noise, and improve temperature control.

In accordance with another embodiment of this invention, said control maintains indoor air quality using said fan and said damper to deliver a specified volume of fresh outside air each hour. Said damper is operated to supply outside air and said fan is controlled at low speed to limit the volume of air supplied to said specified volume.

In accordance with another embodiment, said user interface shows a graphic display of temperature schedules for heating purposes, such that vertical lines represent time periods and horizontal lines represent temperatures. With this arrangement temperatures for four time periods are displayed on one screen that shows weekday settings, and another that shows weekend settings.

In accordance with another preferred embodiment, said user interface can be used to establish low and high temperature limits to be maintained during extended periods of no occupancy, or during vacations. With this arrangement said system will maintain indoor temperatures within said temperature limits using ventilation cooling, air conditioning, or heating as required; ventilation cooling is applied as the primary means of cooling so that air conditioner energy use is minimized.

In accordance with another preferred embodiment, said user interface can be used to override heating and air conditioning settings by selecting temporary indoor temperatures for heating or air conditioning operation, and by selecting the duration over which such settings will remain in effect.

In accordance with another embodiment, said control operates said air conditioner during early morning hours to pre-cool the building so as to avoid air conditioner compressor operation during utility peak load periods.

In accordance with another embodiment, said control includes a communications link 32 (FIG. 1) using telephone, Internet, cable, or other means of connection to outside data sources.

In accordance with another embodiment, said control schedules the operation of said air conditioner to prevent use during utility peak demand periods, using either user time settings or signals communicated by the local electric utility using said communications link.

In accordance with another preferred embodiment, said user interface receives current utility price information using said communication link, and displays the dollar value of energy costs associated with various user temperature settings.

Referring to the drawings, FIG. 1 is a schematic diagram of the integrated heating, ventilation cooling, and air conditioning system ("HVCS") according to an embodiment of the present invention. Main components include control components 1, 3, and 5, air handling unit 9, outside air damper 12, hot water source 18, and condensing unit 17.

The wall display unit ("WDU") 1, includes a liquid crystal display ("LCD") screen, six buttons and four indicator lights. Program code that determines WDU functions is contained in a microprocessor chip in the WDU. The WDU 1 is connected to control module 3 by control wires 2. An outdoor temperature sensor 5 also connects to the control module by control wires 4. Outputs from the control module include blower motor control wires 7, pump control wires 8, damper control wires 14, and condensing unit control wires 6. Blower motor control wires 7 convey a "pulse width modulation" ("PWM") signal to the blower motor to regulate airflow rate.

The air handling unit ("AHU") 9 includes a heat exchange coil 10, which includes separate fluid passages for hot water and refrigerant, the latter being used for cooling purposes, and circulating pump 16. The heat exchange coil optionally contains only hot water passages and is either upstream or downstream relative to the blower. An electronically commutated motor (ECM) 15 powers the blower wheel. The intake of the AHU 9 is connected to outside air damper 12 by a duct 11. When indoor air is being re-circulated, damper 12e rests against seals 12f creating an open passageway between return air inlet 12c and duct 11. Damper 12e rotates counter-clockwise until it rests on seal 12g when outdoor air is needed for fresh air ventilation or ventilation cooling, (referred to as the "open" position).

Coil rows 10 are connected to a heat source 18 by piping 20. Pump 16 circulates water between the heat source and the coil. Piping 19 carries refrigerant between the condensing unit and the coil rows 10b.

Figure 2:
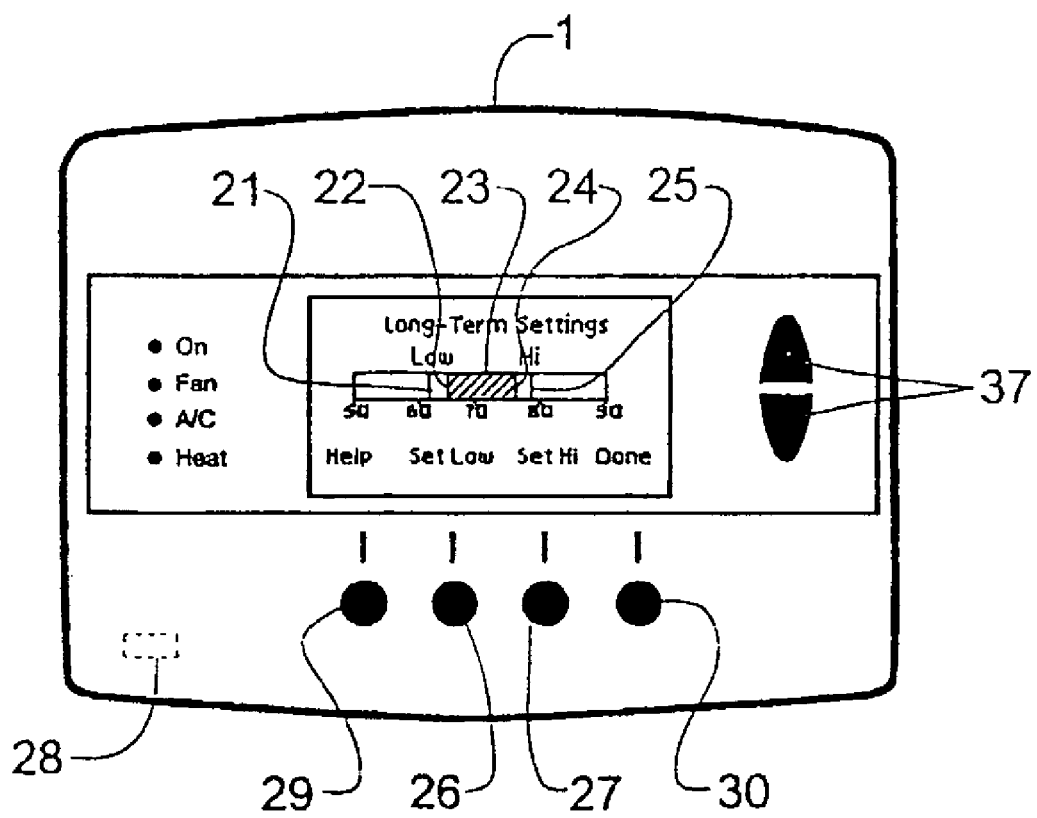
FIG. 2 is a diagram of a user interface, a wall display, unit showing cooling temperature settings according to an embodiment of the present invention.

FIG. 2 is a view of WDU 1 with the cooling settings screen selected. The "Set Low" button 26 allows the user to set a ventilation cooling low limit temperature indicated by line 21. the "Set Hi" button 27 allows the user to set the air conditioner temperature setting, indicated by line 25. Using indoor and outdoor temperature data stored from the current and previous days, high and low temperature settings, and statistical equations contained in the control module microprocessor program, the predicted indoor temperature range for the next day is computed and displayed by comfort bar 23. The right extent of the comfort bar indicated by line 24 is the maximum predicted temperature for the next day, and the left extent of the comfort bar indicated by line 22 is both the lowest predicted temperature for the next morning, and the temperature at which ventilation cooling is terminated. If the right extent of the comfort bar 24 passes the air conditioner setting 25, a message "Air Conditioner Will Run" is displayed. Lowering the low limit setting (line 21) will cause comfort bar 23 to shift to the left, decreasing the likelihood that the "Air Conditioner Will Run" message will be displayed. Raising the air conditioner setting (line 25) will have a similar effect, prompting the using to select settings that can avoid air conditioner operation. As weather becomes warmer the left extent of the comfort bar, line 22, will approach but not pass the low limit setting displayed by line 21 to show that the indoor temperature will not be less than the user-specified low limit setting.

With WDU 1 set to provide cooling, when the outdoor temperature sensed by outdoor temperature sensor 5 falls below the indoor temperature sensed by the WDU by more than a temperature differential set using the WDU, blower motor 15 starts and damper motor 13 is activated. As a result, AHU 9 causes outside air to enter the damper at intake 12a, pass through filter 12d, and flow to the building via supply air outlet 9a that is connected to ducts that convey cool air to all rooms. Excess air pressure from the building interior 31 (FIG. 1) is relieved through return air intake 12c to damper relief opening 12b. If the indoor temperature falls below the minimum indoor temperature displayed by the left end (22) of comfort bar 23, or if the outdoor temperature exceeds the difference between the indoor temperature and the set temperature differential, the blower motor stops and the damper closes. While motor 12 is operating to provide ventilation cooling its speed and the volume of air it delivers is determined as a function of the difference between the high temperature setting displayed by line 25 and the predicted maximum indoor temperature displayed by line 24 on WDU 1. As a result, the AHU provides higher ventilation rates in hotter weather. If the indoor temperature exceeds the high temperature setting set by the user and displayed by line 25 then blower motor 15 and condensing unit 17 will start. As a result, indoor air enters the damper at return air intake 12c, passes through heat exchange coil 10 that is cooled by the condensing unit, and is supplied to building ducting through supply air discharge 9a. During this mode of operation the speed of the blower motor is fixed at a setting selected using the WDU.

With WDU 1 set to provide heating, when the indoor temperature falls below the heating temperature setting, pump 16 and blower motor 15 are turned on. Hot water is circulated between heat exchange coil 10 and heat source 18. Air drawn from the building through return air intake 12c is heated by the coil and delivered to the ducting through supply air discharge 9a. During this mode of operation the speed of the blower motor is a function of the difference between the heating temperature set at the WDU and the indoor air temperature, with the blower operating at a higher speed when the difference is greater. At the beginning of each hour damper 12 opens to admit outside air for the purpose of maintaining indoor air quality. If the blower motor is already operating the damper cycles open and closed repeatedly for short time intervals. If the blower motor is not already operating, the motor starts at a low speed and the damper remains open. Control module 3 keeps track of the volume of outside air that has been introduced to the building each hour by the AHU and cancels further damper operation when the hourly air volume is approximately equal to an amount specified by WDU settings.

With WDU 1 set to maintain "vacation" temperature settings, system heating components maintain the indoor temperature above a low setting, and system cooling components maintain the indoor temperature below a high setting, exactly as described above for heating and cooling operation.

Although the invention has been shown and described with respect to preferred embodiments thereof, it should be understood by those skilled in the art that various changes and omissions in the form and detail thereof may be made therein without departing from the spirit and scope of the invention as defined in the appended claims.

We claim:

1. A system for using outside ventilation air to maintain indoor comfort and air quality, comprising:
   a sensor system for detecting outdoor and indoor air temperatures;
   an air delivery system for delivering the outside ventilation air to an interior space; and
   a programmable controller, operably connected to the sensor system and the air delivery system, that includes:
   a recovery element that receives an outdoor air temperature and an indoor air temperature detected by the sensor system;
   a storage element that stores the detected outdoor air temperature and the detected indoor air temperature detected by the sensor system;
   a calculating element that automatically calculates a predicted indoor temperature range and a predicted outdoor temperature range based on the stored outdoor air temperature and the stored indoor air temperature; and
   a regulating element that automatically regulates operation of the air delivery system as a function of predicted indoor and outdoor air temperature ranges and a predetermined indoor air temperature range.

2. The system of claim 1, further comprising a user interface that displays the predicted and predetermined indoor air temperature ranges and is operably connected to the controller.

3. The system of claim 2, wherein the controller regulates an airflow rate based on the desired indoor air temperature range.

4. The system of claim 1, further comprising a communication link connected to the controller for connection to an outside data source.

5. The system of claim 4, wherein the communication link obtains a weather prediction.

6. The system of claim 4, wherein the controller regulates operation of the air delivery system based on information received from the outside data source over the communication link.

7. The system of claim 1, wherein the controller regulates an indoor air temperature at which cooling by the outside ventilation air is discontinued based on predicted temperatures.

8. The system of claim 1, wherein the controller regulates an airflow rate based on predicted temperatures.

9. The system of claim 1, wherein the controller controls an airflow rate of the outside ventilation air in proportion to a cooling demand.

10. The system of claim 1, wherein the controller controls the air quality by regulating a volume of the outside ventilation air delivered by the air delivery system.

11. The system of claim 1, wherein the air delivery system further comprises a vapor compression air conditioner operably connected to the controller, wherein the controller operates the vapor compression air conditioner during early morning hours to pre-cool a building.

12. The system of claim 1, wherein the controller activates the air delivery system when the outdoor air temperature is lower than the indoor air temperature.

13. The system of claim 1, wherein the air delivery system includes at least one of a vapor compression unit and an evaporative cooling unit to cool the outside ventilation air.

14. A method of maintaining indoor air comfort and air quality with a system having,
   a sensor system for detecting outdoor and indoor air temperatures;
   an air delivery system for delivering the outside ventilation air to an interior space; and
   a programmable controller, operably connected to the sensor system and the air delivery system, that includes:
   a recovery element that receives an outdoor air temperature and an indoor air temperature detected by the sensor system;
   a storage element that stores the detected outdoor air temperature and the detected indoor air temperature detected by the sensor system;
   a calculating element that automatically calculates a predicted indoor temperature range and a predicted outdoor temperature range based on the stored outdoor air temperature and the stored indoor air temperature; and
   a regulating element that automatically regulates operation of the air delivery system as a function of predicted indoor and outdoor air temperature ranges and a predetermined indoor air temperature range, the method comprising:
   detecting an outdoor air temperature and an indoor air temperature;
   storing the detected outdoor air temperature and the detected indoor air temperature;
   calculating a predicted indoor temperature range and a predicted outdoor temperature range based on the stored outdoor air temperature and the stored indoor air temperature; and
   regulating operation of an air delivery system to deliver outside ventilation air into an interior space as a function of the predicted indoor and outdoor air temperature ranges and the predetermined indoor air temperature range.

15. The method of claim 14, further comprising inputting a desired indoor air temperature through a user interface.

16. The method of claim 14, further comprising connecting the controller to an outside data source via a communication link.

17. The method of claim 16, further comprising obtaining a weather prediction via the communication link.

18. The method of claim 14, further comprising regulating an indoor air temperature by controlling movement of outside ventilation air based on predicted temperatures.

19. The method of claim 14, further comprising activating at least one of a vapor compression unit and an evaporative cooling unit to cool outside ventilation air.

20. The method of claim 14, further comprising activating the air delivery system when the outdoor air temperature is lower than the indoor air temperature.

* * * * *

UNITED STATES PATENT AND TRADEMARK OFFICE
CERTIFICATE OF CORRECTION

PATENT NO. : 7,398,821 B2  Page 1 of 1
APPLICATION NO. : 09/802883
DATED : July 15, 2008
INVENTOR(S) : Leo I. Rainer and Emiko Kambe It is certified that error appears in the above-identified patent and that said Letters Patent is hereby corrected as shown below:

IN COLUMN 1 LINES 3-4:

After the Title, please insert the following:

--This invention was made with State of California support under California Energy Commission Contract No. 500-02-026. The Energy Commission has certain rights to this invention.--

Signed and Sealed this

Twenty-third Day of September, 2008

JON W. DUDAS
*Director of the United States Patent and Trademark Office*

UNITED STATES PATENT AND TRADEMARK OFFICE
CERTIFICATE OF CORRECTION

PATENT NO.         : 7,398,821 B2                                           Page 1 of 1
APPLICATION NO.    : 09/802883
DATED              : July 15, 2008
INVENTOR(S)        : Leo I. Rainer and David A. Springer It is certified that error appears in the above-identified patent and that said Letters Patent is hereby corrected as shown below:

IN COLUMN 1:

After the Title lines 3-4, please insert the following:

This invention was made with State of California support under California Energy Commission Contract No. 500-02-026. The Energy Commission has certain rights to this invention.

Signed and Sealed this

Second Day of December, 2008

JON W. DUDAS
*Director of the United States Patent and Trademark Office*